(12) United States Patent
Mackiewich et al.

(10) Patent No.: US 7,212,536 B2
(45) Date of Patent: May 1, 2007

(54) USER PRIORITY MAPPING IN BRIDGED VLANS

(75) Inventors: Blair T. Mackiewich, Surrey (CA);
Thomas Tadsen, Burnaby (CA);
Yuming Wen, Delta (CA); Radu C. Ungureanu, Coquitlam (CA)

(73) Assignee: Alcatel-Lucent Canada Inc., Ottawa, Ontario (CA)

( * ) Notice: Subject to any disclaimer, the term of this patent is extended or adjusted under 35 U.S.C. 154(b) by 931 days.

(21) Appl. No.: 10/026,734

(22) Filed: Dec. 27, 2001

(65) Prior Publication Data
US 2003/0123460 A1 Jul. 3, 2003

(51) Int. Cl.
*H04L 12/66* (2006.01)
*H04L 12/28* (2006.01)

(52) U.S. Cl. ............... 370/395.42; 370/401; 370/352; 370/392

(58) Field of Classification Search ........... 370/395.42, 370/395.43, 395.53, 401, 407, 235, 392
See application file for complete search history.

(56) References Cited

U.S. PATENT DOCUMENTS

| | | | | |
|---|---|---|---|---|
| 5,903,559 A | * | 5/1999 | Acharya et al. ............ 370/355 |
| 5,949,785 A | * | 9/1999 | Beasley ...................... 370/398 |
| 5,953,318 A | * | 9/1999 | Nattkemper et al. ........ 370/236 |
| 6,085,238 A | * | 7/2000 | Yuasa et al. ................. 709/223 |
| 6,456,962 B1 | * | 9/2002 | Allingham et al. ........... 703/26 |
| 6,483,853 B1 | * | 11/2002 | Kshirsagar et al. ......... 370/466 |
| 6,507,583 B1 | * | 1/2003 | Beasley ................... 370/395.1 |
| 6,650,646 B1 | * | 11/2003 | Galway et al. ............. 370/397 |
| 6,917,614 B1 | * | 7/2005 | Laubach et al. ............ 370/392 |

* cited by examiner

*Primary Examiner*—Hanh Nguyen
(74) *Attorney, Agent, or Firm*—Oyen Wiggs Green & Mutala LLP

(57) ABSTRACT

A virtual LAN (VLAN) has a number of segments connected by a connection-based network. A method for providing differentiated service to frames having different user priorities in a VLAN carries frames associated with different user priorities over different channels in the connection-based network. The connection-based network may be an ATM network in which channels are specified by a connection identifier which may comprise a VPI/VCI pair. A bridge according to the invention has one or more bridge ports. Each of the bridge ports may be associated with a VPI. The bridge ports may each be associated with a plurality of service interfaces each capable of terminating a connection in the connection-based network. The service interfaces may each be associated with a VCI. Priority tagged frames received at the bridge port are mapped to service interfaces on the basis of their user priorities.

28 Claims, 7 Drawing Sheets

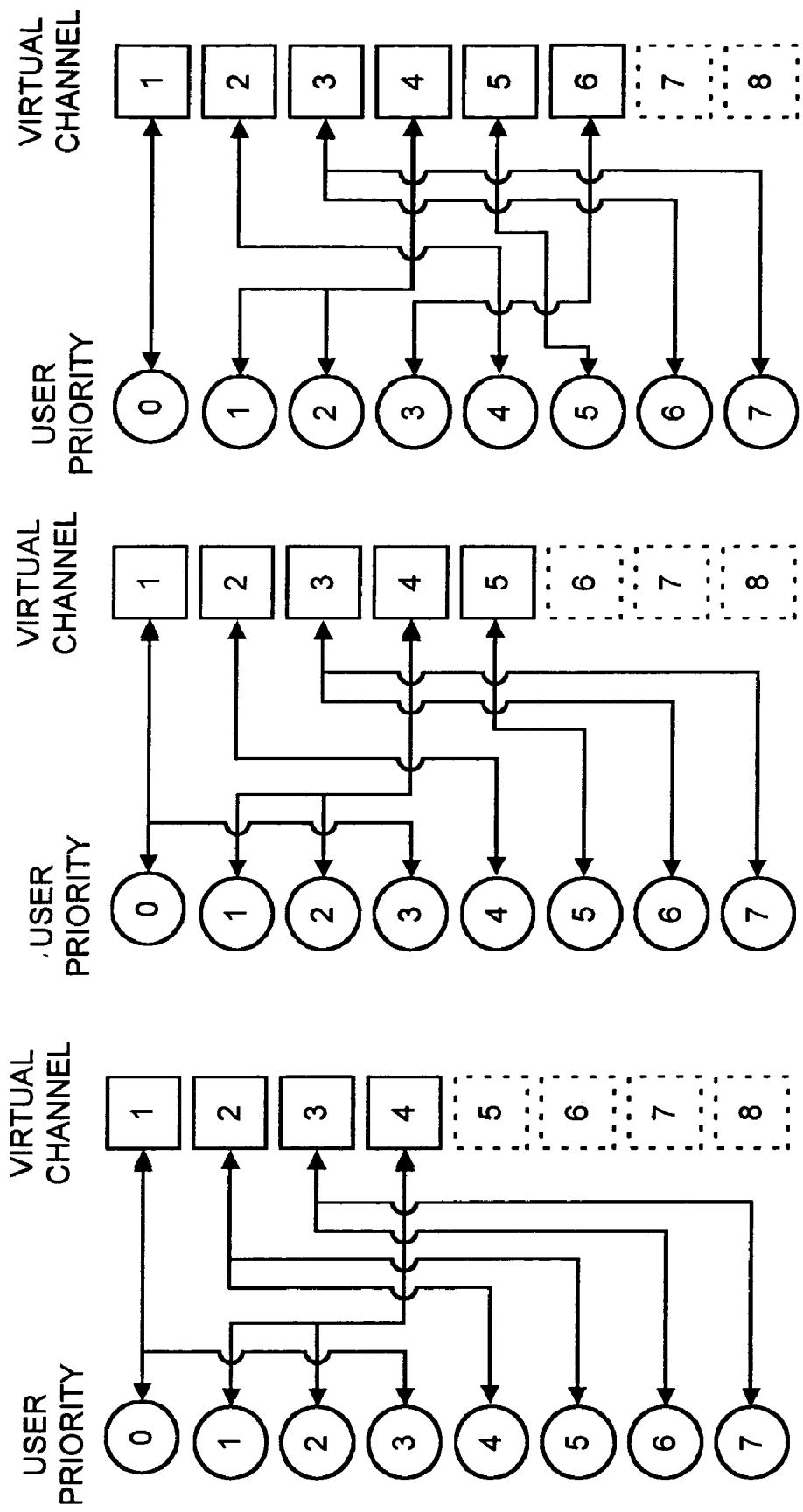

USER PRIORITY MAPPING IN BRIDGED VLANS

TECHNICAL FIELD

The invention relates to data communication networks which include bridges or similar data handling devices. The invention relates particularly to bridges and methods performed in bridges for maintaining differential treatment of data frames having different priorities in a virtual LAN (VLAN). Data may be carried between segments of the VLAN by connections in a connection-based network such as an asynchronous transfer mode (ATM) network or a multi-protocol label switching ("MPLS") network.

BACKGROUND

In this disclosure the term virtual LAN ("VLAN") means a data communication network which comprises a number of segments which are connected together by links which operate according to a networking protocol different from that of the network segments. For example, two segments of an ethernet network may be connected by way of a channel in a connection-based network. The channel may be, for example, a virtual circuit in an asynchronous transfer mode (ATM) network. Each of the network segments may be interfaced to the connection-based network by a bridge.

Data may be delivered between the segments in any of a wide number of ways. For example, where the segments comprise ethernet segments and the network which connects the segments comprises an ATM network then ethernet frames may be carried between the segments according to standards such as local area network emulation ("LANE"), multi-protocol over ATM ("MPOA") or IP over ATM. Data may be carried on a path in a MPLS network. The particular format by which data is conveyed between network segments is not important to this invention.

IEEE standard 802.1Q provides a set of capabilities which permit media access control (MAC) bridges to define and manage networks in which multiple broadcast domains can co-exist on a single physical medium. This IEEE standard uses the term "VLAN" to describe such networks. In this disclosure the term VLAN is not used in the same sense as it is in IEEE 802.1Q (although this invention may be applied to networks which operate, or which include portions which operate, according to IEEE 802.1Q). IEEE standard 802.1D describes the operation of MAC bridges.

Various networking protocols permit priorities (sometimes called "user priorities") to be assigned to data. Through the use of such protocols, data having different priority levels can be treated differently. For example, certain levels of Quality of Service (QoS) may be specified for each priority level. An example of a networking protocol which accommodates user priorities is the IEEE 802.1D standard which relates to ethernet networks. Annex H of IEEE standard 802.1D describes a way to map user priorities to service queues.

U.S. Pat. No. 6,175,569 discloses a method for extending QoS guarantees to stations on a token ring LAN. The method involves a LAN station originating a request for a connection through an ATM network to either a remote ATM station or a remote LAN station. A LAN/ATM interface device receives the request and attempts to establish the requested connection.

U.S. Pat. No. 5,978,378 discloses a method for identifying frames which relate to a VLAN and excluding such frames from ports not associated with the VLAN.

There is a need for ways to accommodate user priorities in VLANs.

SUMMARY OF THE INVENTION

The invention relates to methods and apparatus for handling data frames having different priorities in bridges and bridged VLANS. One aspect of the invention provides apparatus for handling data frames which are each associated with one of a plurality of priorities. The apparatus comprises: a bridge having a plurality of bridge ports, a first one of the bridge ports having a plurality of service interfaces, each of the service interfaces capable of being associated with a channel in a connection-based network; a map associated with the first one of the bridge ports, the map providing a correspondence between each of the plurality of priorities and one of the service interfaces; and a forwarding system configured to read a priority of a data frame to be forwarded onto the connection-based network by way of the first one of the ports, identify a service interface which the map indicates corresponds to the read user priority and forward the data frame over a channel in the connection-based network associated with the identified service interface.

In some embodiments, each of the service interfaces is associated with a channel identified by a predetermined connection identifier. The connection-based network may comprise an ATM network in which channels are each identified by a connection identifier comprising a VPI and a VCI. Each of the service interfaces associated with the first one of the bridge ports may be associated with a channel having the same predetermined VPI.

Another aspect of the invention provides a bridge for connecting a segment of a LAN to a connection-based network. The bridge comprises: a plurality of bridge ports; means for reading priorities of data frames directed by the bridge to at least a first one of the bridge ports; a plurality of service interfaces associated with the first one of the bridge ports, each of the service interfaces capable of being associated with a channel in a connection-based network; means for determining a number of the service interfaces associated with active connections in the connection-based network; means for establishing a mapping between user priorities read by the means for reading priorities of data frames and the service interfaces associated with active connections in the connection-based network based at least in part on a number of the service interfaces associated with active connections in the connection-based network; and, means for assigning frames to the service interfaces based upon the user priorities and the mapping.

A still further aspect of the invention provides a method for directing frames between segments of a VLAN over a connection-based network. The method comprises: receiving at a first bridge port connected to a first segment of a VLAN a frame addressed to a node on a second segment of the VLAN; forwarding the frame to a second bridge port associated with a second segment of the VLAN and determining a user priority of the frame; and, based on the user priority, assigning the frame to one of a plurality of service interfaces associated with the second bridge port, each of the service interfaces capable of delivering data to the second segment of the VLAN by way of a corresponding channel in a connection-based network.

Further aspects of the invention and features of specific embodiments of the invention are described below.

BRIEF DESCRIPTION OF THE DRAWINGS

In drawings which illustrate non-limiting embodiments of the invention,

FIGS. 5A through 5H illustrate a scheme comprising a plurality of mappings between user priorities and channels for different numbers of available channels;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
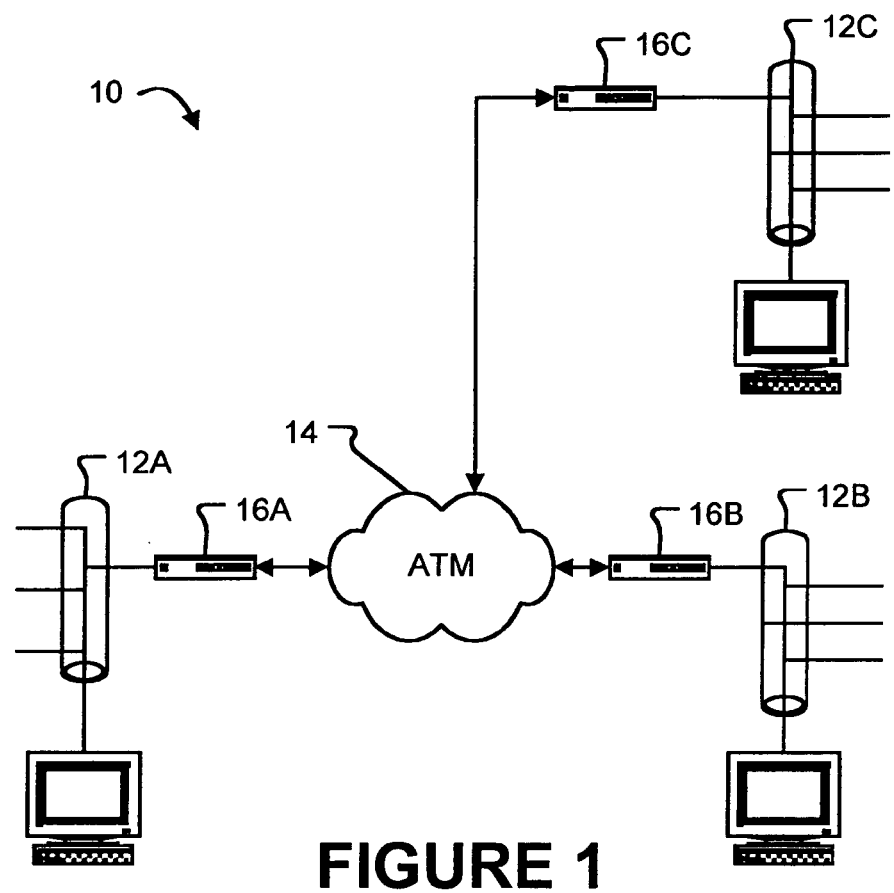
FIG. 1 is a schematic diagram of a network having a number of ethernet segments connected by channels in a connection-based network.

FIG. 1 illustrates a simple network 10. Network 10 comprises three ethernet segments 12A, 12B and 12C. Ethernet segments 12A, 12B, and 12C are interconnected by a connection-based network 14. Connection-based network 14 may comprise, for example, an ATM network or an MPLS network. Bridges 16A, 16B and 16C (collectively bridges 16) respectively provide interfaces between ethernet segments 12A, 12B and 12C and connection-based network 14. Connection-based network 14 provides channels (which may be virtual circuits) capable of carrying data between bridges 16. The virtual circuits may comprise, for example, switched virtual circuits ("SVCs"), soft permanent virtual circuit connections ("SPVCs"), permanent virtual circuit connections ("PVCs") or other channels capable of carrying data between bridges 16.

Figure 2:
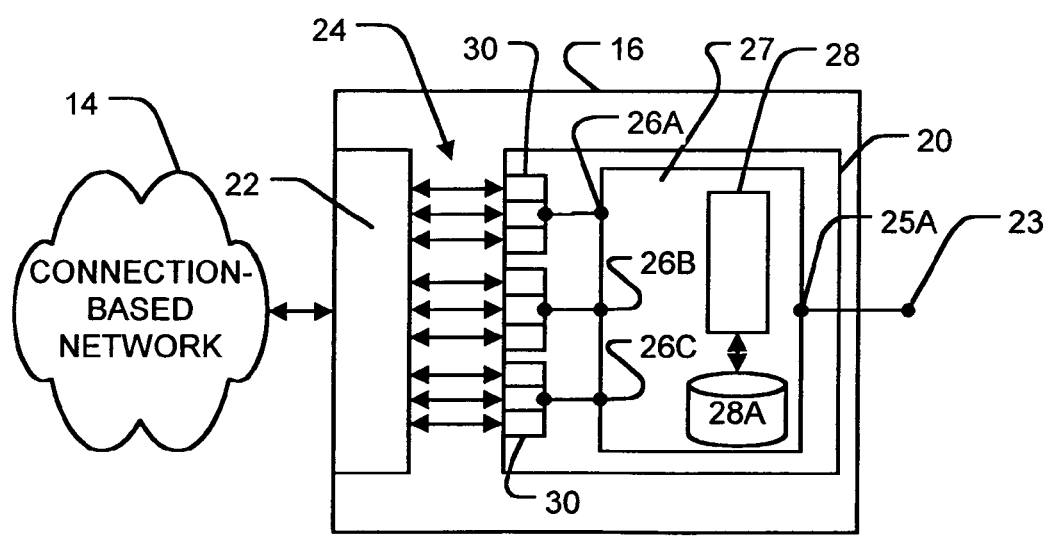
FIG. 2 is a block diagram of a bridge which according to one embodiment of the invention.

As shown in FIG. 2, in one embodiment of the invention, each bridge 16 comprises an ethernet card 20 which connects to a cell relay card 22 by way of a device fabric 24. Cell relay card 22 provides an interface to connection-based network 14. Device fabric 24 extends channels of connection-based network 14 to ethernet card 20. Ethernet card 20 provides a local interface 23 to a LAN segment.

A bridging system 27 is on ethernet card 20. Bridging system 27 comprises a plurality of bridge ports by way of which data can be sent and/or received. For convenience of description, bridge ports which send data to and receive data from a local interface 23 connected to a local network segment are indicated by the reference numeral 25 while bridge ports which send and receive data by way of device fabric 24 are indicated by the reference numeral 26. Each of the bridge ports may be associated with a number of services. The services may, for example, dispatch data to different destinations by way of connections in connection-based network 14, maintain data in priority queues in connected ethernet networks, dispatch ethernet data frames or the like.

In the illustrated embodiment, bridge 16 includes a filtering system 28 which includes a filtering database 28A. Filtering database 28A keeps records which associate known destinations with the bridge ports by way of which data can be sent to those known destinations. Filtering system 28 drops packets which are addressed to destinations located on the same port at which the packets are received. When filtering system 28 receives at a bridge port a packet addressed to a destination known to be associated with another bridge port then filtering system 28 forwards the packet to the other bridge port. When filtering system 28 receives at a bridge port a packet destined for a destination not known to filtering database 28A then filtering system 28 may send the packet to all other bridge ports so that the packet can reach its destination if it is on a segment 12 which can be reached from bridge 16. The construction and use of filtering systems and filtering databases in network bridges is well known to those skilled in the art and is therefore not described herein in detail.

Bridge 16 receives packets from a connected LAN segment 12 at local interface 23 which is connected to a first bridge port 25. Bridge 16 may comprise additional bridge ports connected to additional local interfaces (not shown) which are associated with different LAN segments. Bridge 16 also passes data received from other sources (such as other LAN segments) to LAN segment 12 by way of bridge port 25. Bridge port 25 may implement a set of service queues which handle the forwarding of packets having different user priorities onto LAN segment 12. The service queues may be implemented, for example, according to the IEEE 802.1D and 802.1Q specifications.

Bridging system 27 has one or more bridge ports 26 which can each be used to send and receive data by way of connection-based network 14. In the embodiment illustrated in FIG. 2 there are three such bridge ports 26A, 26B and 26C. Each of these bridge ports 26 is associated with a plurality of service interfaces 30. Each of service interfaces 30 may be associated with a channel through cell relay network 14.

For example, where connection-based network 14 comprises an ATM network then each of bridge ports 26A, 26B and 26C may be associated with one or more virtual circuits through ATM network 14. Each channel is identified by a connection identifier. The connection identifier may comprise a pair of a virtual path identifier ("VPI") and a virtual channel identifier ("VCI").

In specific embodiments of the invention, each of service interfaces 30 is associated with a specific connection identifier that identifies a connection in fabric 24 (which may be considered to be an extension of ATM network 14). In some implementations of the invention the connections in device fabric 24 are identified by VPI/VCI pairs and each bridge port 26 is associated with a predetermined VPI. Different service interfaces 30 associated with each of bridge ports 26 (in this example, each service interface 30 provides a connection to a virtual circuit in ATM network 14) may be made to correspond with a different VCI. Each of service interfaces 30 thereby has a predetermined association with a specific channel in device fabric 24 which is identified by the VPI/VCI pair obtained from the VPI associated with the port 26 with which the service interface 30 is associated and the VCI associated with the service interface 30.

In typical applications the set of channels available to each bridge port 26 extend to a common destination. In this example, each of the channels extend to a corresponding bridge port 26 on another one of bridges 16. At a given time each of bridge ports 26A, 26B, and 26C may have access to a number (zero, one, or more) of available channels in connection-based network 14 by way of the service interfaces 30 which are associated with that bridge port 26. In general, the number of channels available to each bridge port 26 may be different. The number of available channels may vary. From time-to-time an additional channel may be made available to a bridge port 26 or some channels may become unavailable due to reassignment of resources in connection-based network 14. Some channels may also become unavailable due to failures of connections in connection-based network 14.

Figure 3:
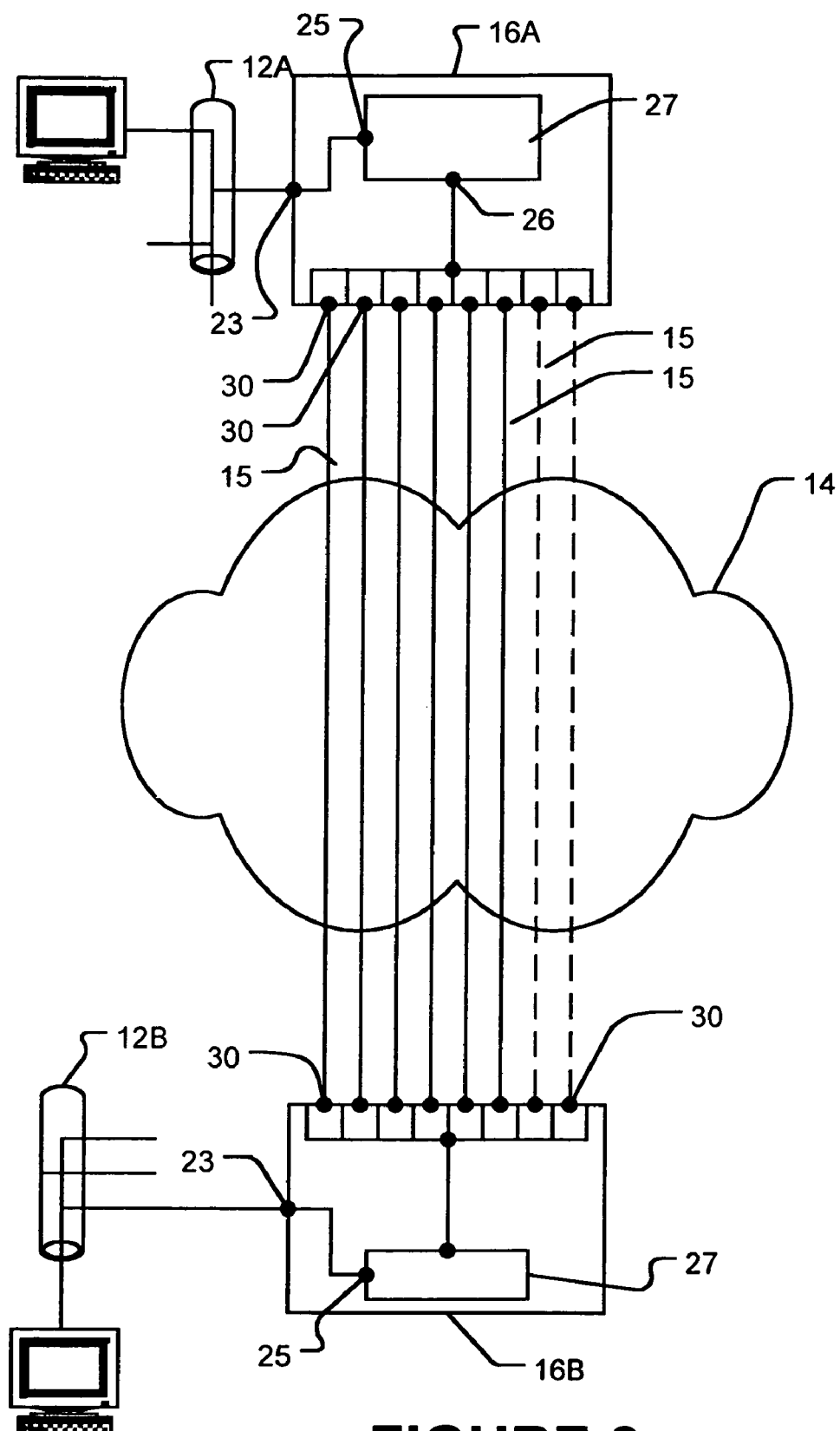
FIG. 3 illustrates a pair of segments of a VLAN interconnected by a plurality of channels through a connection-based network.
Figure 4:
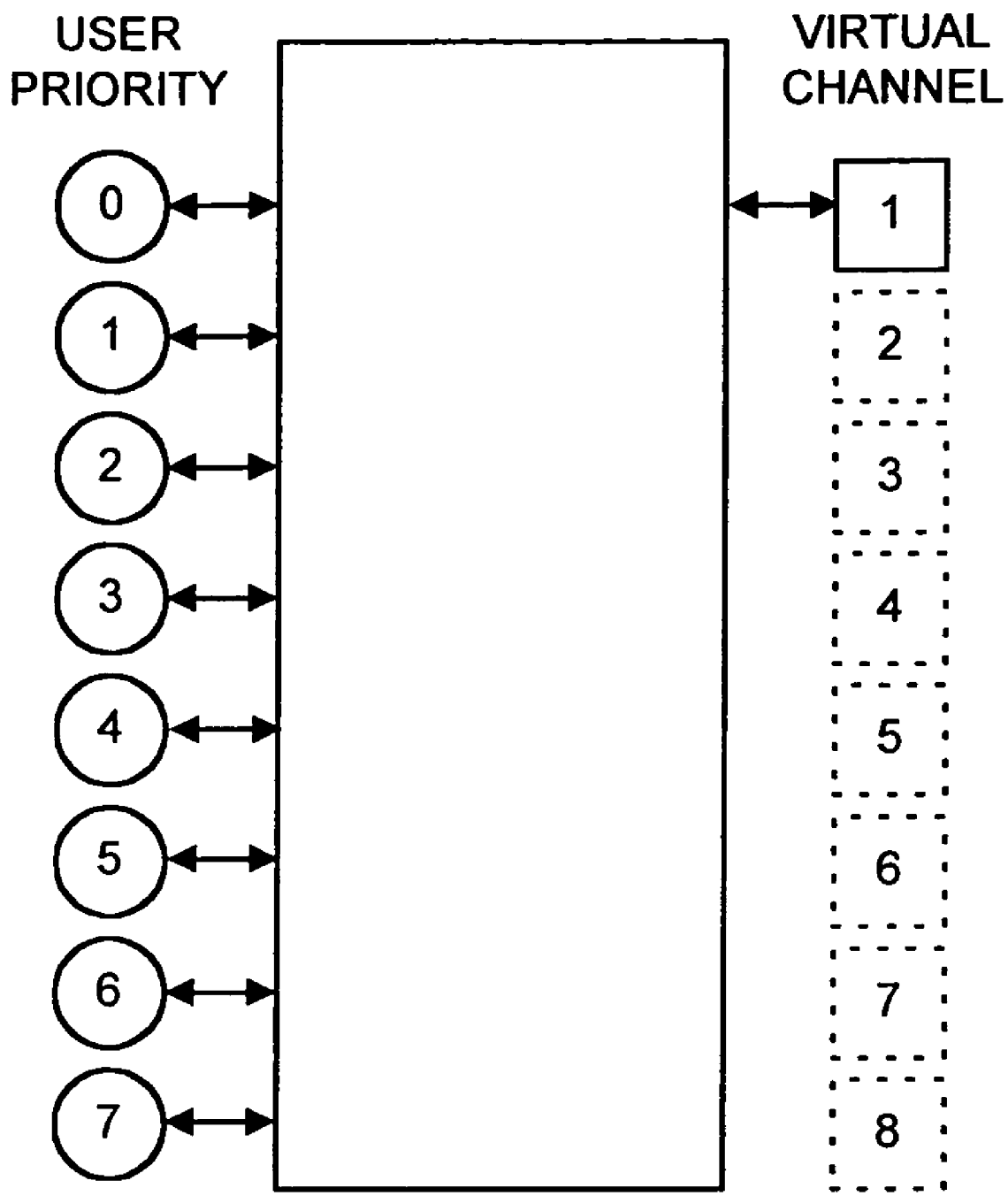
FIG. 4 is a diagram illustrating a set of service interfaces which receives data frames, which each may be associated with one of a number of different user priorities, and forwards the data frames by way of a number of active channels according to a currently active mapping between user priorities and channels.

FIG. 3 illustrates a portion of a VLAN 10 in which two bridges 16 are interconnected by a plurality (8 in this example) of channels 15 through a connection-based network 14. 6 of the channels are available for carrying data. Two of the channels 15 which are drawn in dashed lines are unavailable. Where there are a plurality of available channels 15 connecting segments 12A and 12B then each of the available channels may be assigned to carry data of different priorities.

Data packets on each LAN segment 12 may be associated with a user priority. For example, VLAN-tagged and priority-tagged ethernet frames have a header which includes a three-bit user-priority field. The user priority field can hold values in the range of 0 to 7. Typically a user-priority value of 0 indicates that no priority has been assigned to the frame. User priority values in the range of 1 to 7 indicate different priority levels with 7 indicating highest priority and 1 indicating lowest priority. The user priorities may be assigned, for example in accordance with Appendix H of IEEE specification 802.1D. Other schemes for assigning user priorities to data frames could also be used.

Bridging system 27 maintains a mapping between user priorities and available channels 15 in cell relay network 14. In preferred embodiments, for each of bridge ports 26, a map is maintained. The map may comprise, for example, a lookup table accessible to the system which manages the port 26. The map associates each of the user priorities in whatever system of user priorities is being used with a channel 15 in connection-based network 14 which is accessible by way of one of the service interfaces 30 associated with the port 26. The map may map between user priorities and predetermined connection identifiers for the channels. For example, bridging system 27 may contain data which associates each of bridge ports 26 with a VPI and data which associates each of service interfaces 30 with a VCI, as described above. Equivalently, the map may map between user priorities and service interfaces 30.

Providing a predetermined mapping between bridge ports 26 and channel identifiers (such as VPIs) can permit channels in the connection-based network to be extended seamlessly to bridge ports 26.

Different channels 15 in cell relay network 14 may be configured to provide different desired levels of QoS. For example, low-priority frames could be sent over a channel 15 comprising an unspecified bit rate (UBR) virtual circuit. Higher priority frames could be sent over a channel 15 comprising a variable bit rate (VBR) virtual circuit. By assigning different ATM traffic parameters to the virtual circuits, multiple classes of LAN transport are established. Different channels 15 could take different routes through cell relay network 14.

In preferred embodiments, for each bridge port 26 there is at most one channel 15 in cell relay network 14 for each user priority. Within each bridge port 26, one or more user priorities may be mapped to each service interface 30. This ensures that the order in which frames are received on the same bridge port 26 will be preserved within any user priority class and is compatible with the requirements of the Spanning Tree Protocol for network configuration. All channels 15 which originate at a bridge port 26 preferably terminate at the same location (for example, a bridge port 26 in another bridging system 27).

Figure 6:
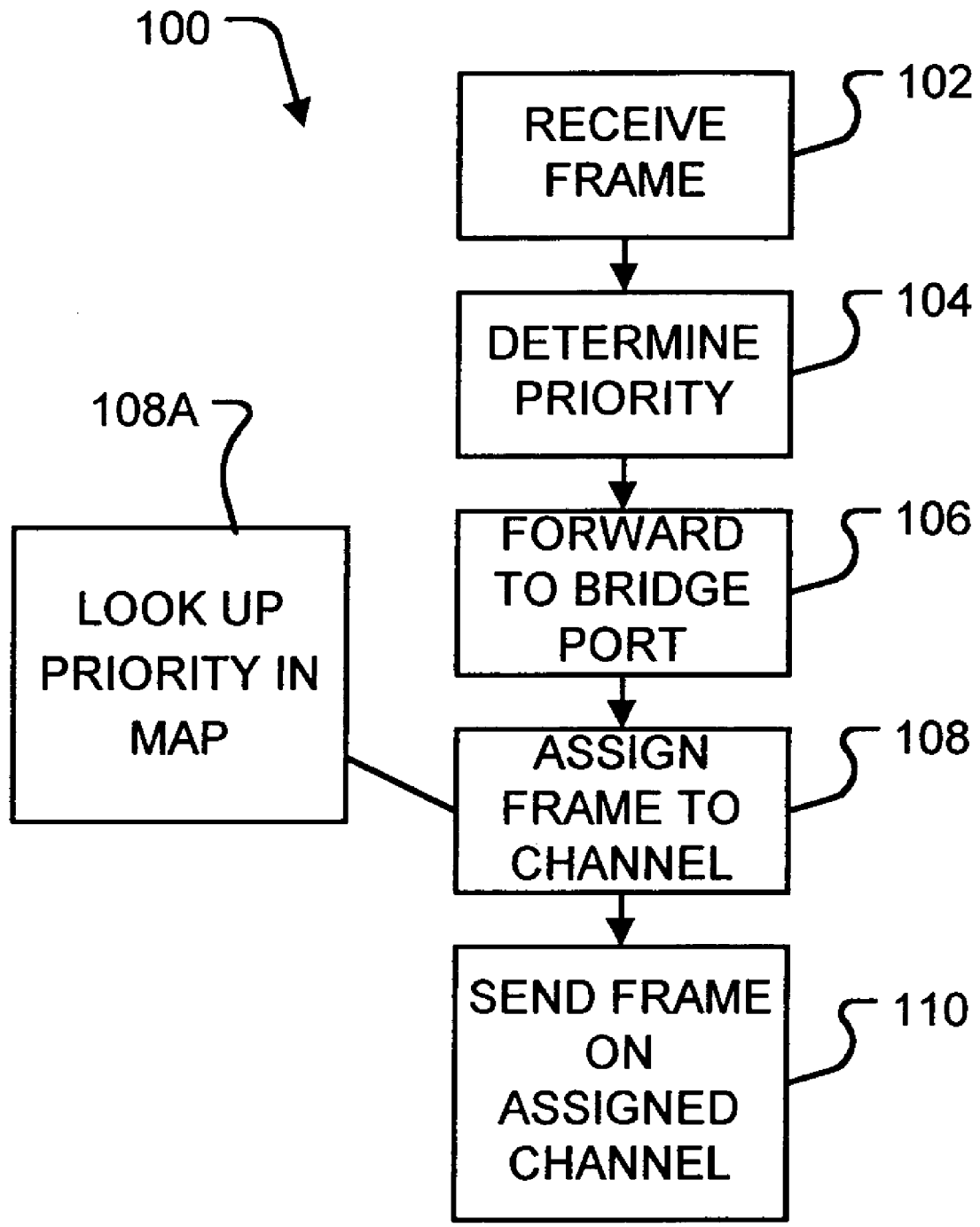

FIG. 6 illustrates a method 100 according to the invention for forwarding a priority tagged data frame. A frame is received at block 102. In blocks 104 and 106 the priority of the frame is determined and the frame is forwarded to a bridge port for delivery to a destination. Blocks 104 and 106 may occur in either order. In block 108, the frame is assigned to a channel (or equivalently to a service interface associated with an available channel). Assigning the frame to a channel may comprise looking up the priority determined in block 104 in a map. Then in block 110 the frame is forwarded on the channel.

The mapping used by bridging system 27 for a bridge port 26 will depend upon the number of channels 15 available to the bridge port 26 (e.g. to a number of the service interfaces 30 which are connected to active channels in network 14). Since the number of available connections 15 may vary over time, a scheme comprising a plurality of mappings may be provided. As the number of available channels 15 changes, different mappings are selected from the scheme. For example, where, for a particular bridge port 26 there is only a single channel 15 available, the mapping is trivial. All data which passes through that bridge port 26 must travel on the single available channel. As more channels 15 become available, the correspondence between user priorities and channels 15 can be remapped so that frames having different user-priorities can be sent over different channels 15. The mapping may be stored in a lookup table, the lookup table may be updated each time a channel is added or dropped.

Bridging system 27 may track the channels available at service interfaces 30 of a port 26 in various ways including receiving and processing connect requests from a system which manages network 14 (or a part thereof) or receiving information regarding channels via signalling in network 14.

Preferably, the scheme of mappings used by bridging system 27 is such that when a channel 15 is added, only frames having priorities which will be carried on the newly added channel need to be remapped. Table I illustrates an example scheme for mapping frames with different user-priorities to different numbers of channels (numbered from 1 to 8). FIGS. 5A through 5H illustrate the mappings which may be provided for 1 to 8 available channels. In Table I, the channels are numbered from 1 to 8, with number 1 being assigned to the first available channel number 2 to the next available channel, and so on.

The scheme of Table I minimizes priority remapping when channels are added or removed. It can bee seen, for example, that when a third channel becomes available only those frames having user priorities 6 and 7 are remapped according to the scheme of mappings of Table I. Other equivalent schemes in which only those priorities carried by a channel which is added or removed require remapping also provide this benefit.

TABLE I

ASSIGNMENTS OF PRIORITIES TO CHANNELS FOR DIFFERENT NUMBERS OF CHANNELS

| | Number of channels | | | | | | | |
|---|---|---|---|---|---|---|---|---|
| | 1 | 2 | 3 | 4 | 5 | 6 | 7 | 8 |
| Priority | Connection Used for Priority | | | | | | | |
| 0 | 1 | 1 | 1 | 1 | 1 | 1 | 1 | 1 |
| 1 | 1 | 1 | 1 | 4 | 4 | 4 | 4 | 4 |
| 2 | 1 | 1 | 1 | 4 | 4 | 4 | 4 | 8 |
| 3 | 1 | 1 | 1 | 1 | 1 | 6 | 6 | 6 |
| 4 | 1 | 2 | 2 | 2 | 2 | 2 | 2 | 2 |
| 5 | 1 | 2 | 2 | 2 | 5 | 5 | 5 | 5 |
| 6 | 1 | 2 | 3 | 3 | 3 | 3 | 3 | 3 |
| 7 | 1 | 2 | 3 | 3 | 3 | 3 | 7 | 7 |

Preferably channels 1 through 8 are made available in order (unless one or more channels has failed). Where channels are made available in order, a higher-numbered channel cannot be established until all lower-numbered channels have been established.

If data which is untagged (i.e. does not include an explicit user priority) arrives at a bridge 16 on a channel, then bridge 16 can use the mapping between channels (or service interfaces) and user priorities and information identifying the channel (or service interface) on which the data arrived to assign a priority to the data and to tag the data with the assigned priority. If more than one user priority is assigned to the same channel then the bridge 16 may assign a priority to data which arrives on that channel according to a rule. For example, the bridge 16 may assign to the data the lowest priority currently mapped to the channel on which the data was received.

Preferably, the channels to which the ports of bridging system 27 are associated are either all endpoints of point to point (P2P) connections, leaf endpoints of point to multi point (P2MP) connections or root endpoints of P2MP connections. All of the channels preferably terminate at the same device. This simplifies configuration.

Bridges 16 may permit support for user priorities to be disabled. Where support for user priorities is disabled, all VLAN traffic may be carried across connection-based network 14 over a single channel per port.

In cases where the connection identifier (such as a VPI/VCI value) corresponding to each service interface 30 of bridging system 27 is predetermined, a channel may be set up through connection-based network 14 to a specific service interface 30 of bridging system 27 using signalling. Where cell relay network 14 comprises an ATM network, the channels in network 14 may be provided by soft permanent virtual circuits (SPVCs) which connect to service interfaces 30. If a SPVC needs to be rerouted then it can reconnect to a service interface 30 without reconfiguration because the service interface 30 has a predetermined VPI/VCI assignment.

Bridges 16 are preferably configured to accommodate the possibility that one or more channels may fail. Bridge 16 may receive a signal indicating that a channel has failed. The message may be generated by any suitable failure detection mechanism. One such mechanism is described, for example, in the commonly owned and co-pending application entitled METHOD AND APPARATUS FOR CHECKING CONTINUITY OF LEAF-TO-ROOT VLAN CONNECTIONS which is hereby incorporated by reference herein. Upon the failure of a channel (or upon the failure of a channel out of order) bridge 16 may react in various ways including:

bumping data having each of the user priorities which had been assigned to the failed channel to the channel handling the next lower user priority;

bumping the user priority (or priorities) which had been assigned to the failed channel to the channel handling the lowest priority frames for which a channel remains available; and, dropping frames having the user priority (or priorities) associated with the failed channel.

Where N channels are provided and one of the channels fails then bridge 16 could also react by remapping the associations between user priorities and the available channels according to Table I for the case where there are N-1 channel (with the channels renumbered to exclude the failed channel). Depending upon the value of N and which channel it is that failed, this could result in the need to reroute frames in addition to those which would otherwise have been carried on the failed channel. Preferably the manner in which bridging system 27 reacts to failure of a channel is configurable.

Figure 5C:
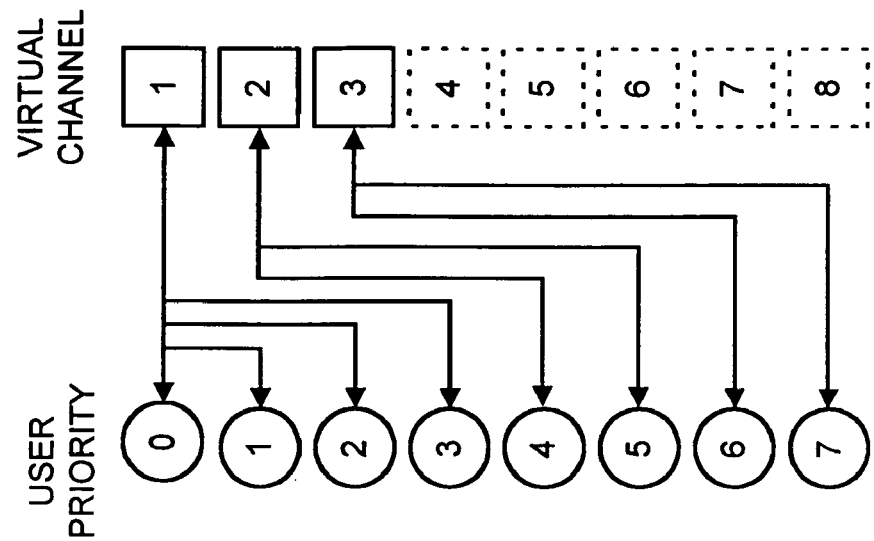
Figure 5B:
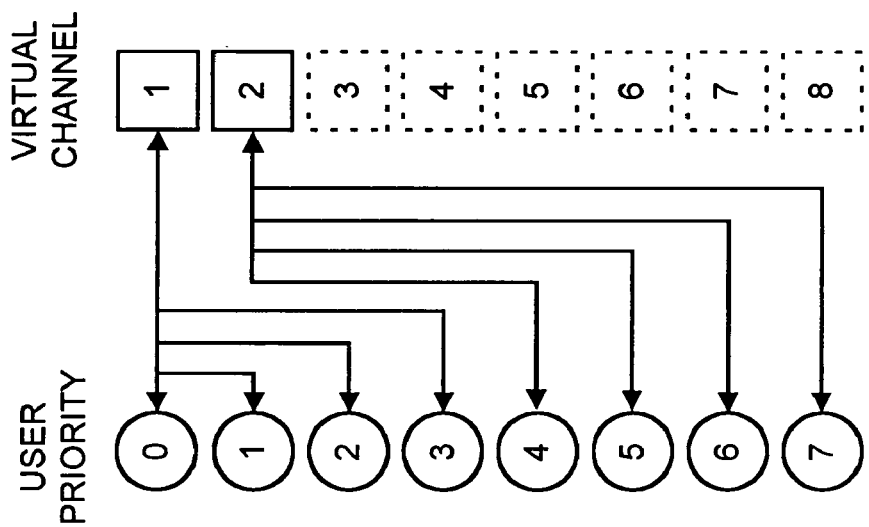
Figure 5A:
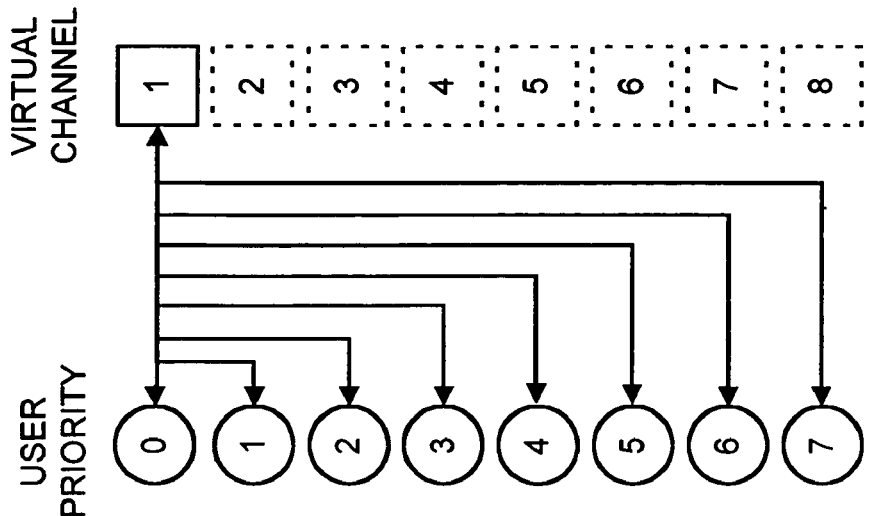
Figure 5I:
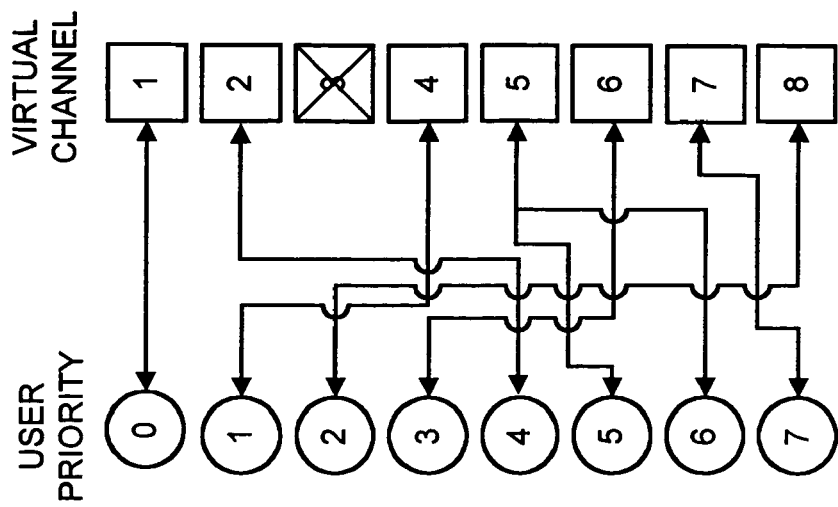
FIG. 5I shows an example of one way to remap user priorities to channels upon failure of a channel; and, FIG. 6 is a flow chart which illustrates a method for forwarding data frames according to one embodiment of the invention.
Figure 5H:
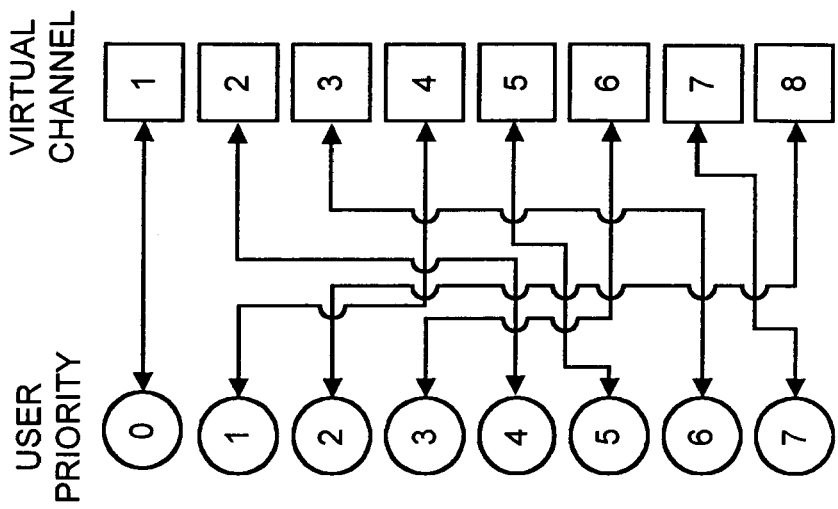
Figure 5G:
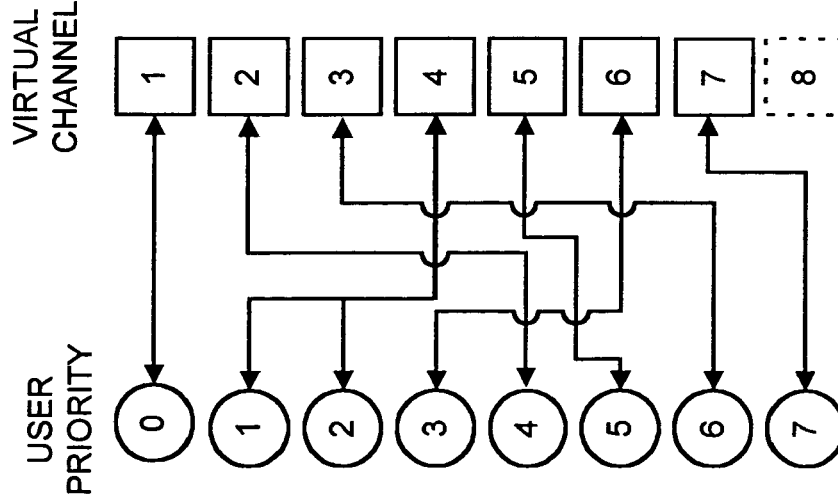

FIG. 5I illustrates a situation which may exist after failure of the channel labelled 3. Frames associated with the user priority "6" which had previously been carried on channel 3 are rerouted to be carried on channel 5 (which was previously carrying only frames of user priority 5). This is an example of bumping each of the user priorities which had been assigned to the failed channel to the channel handling the next lower user priority.

As noted above, in some embodiments of the invention, bridging system 27 is on a card located 20 in a bridge 16 and the final part of each channel 15 extends through a device fabric 24 which is internal to the bridge 16. In such cases the VPI/VCI or other connection identifier assigned to channels terminating at service interfaces 30 of bridging system 27 may be internal to the bridge 16.

Those skilled in the art will appreciate from the foregoing that it is possible to implement this invention in ways which provide a predetermined mapping between user priorities channels. More priorities may be supported automatically as more channels become available to carry data. In preferred embodiments of the invention it is not necessary to reroute all data traffic as channels are added and dropped. Upon failure of a channel traffic may be automatically routed to a lower priority.

Certain implementations of the invention comprise computer processors which execute software instructions which cause the processors to perform a method of the invention. For example, bridging system 27 may comprise a computer processor which executes software instructions which cause the processor to associate specific ones of ports 30 with specific channels on cell relay network 14. The invention may also be provided in the form of a program product. The program product may comprise any medium which carries a set of computer-readable signals comprising instructions which, when executed by a computer processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, maps are described above as comprising lookup tables. Maps may also comprise other hardware, software, or hardware-software combinations which are capable of maintaining a correspondence between user priorities and service interfaces 30 (or, equivalently, available ones of channels 15). The invention has application to devices other than bridges. For example, the invention could be applied to devices such as ethernet LAN services units ("ELSUs") which simply present all ethernet traffic to connected channels such as ATM virtual channels, and receive traffic from the connected channels but do not necessarily provide other functions often provided by bridges. Accordingly, the scope of the invention is to be construed in accordance with the substance defined by the following claims.

What is claimed is:

1. Data handling apparatus for handling data frames which are each associated with one of a plurality of priorities, the apparatus comprising:
   a bridge having a plurality of bridge ports, a first one of the bridge ports having a plurality of service interfaces, each of the service interfaces associated with a channel in a connection-based network;
   a map associated with the first one of the bridge ports, the map providing a correspondence between each of the plurality of priorities and one of the service interfaces;
   a forwarding system configured to read a priority of a data frame to be forwarded onto the connection-based network by way of the first one of the ports, identify a service interface which the map indicates corresponds to the read user priority and forward the data frame over the channel in the connection-based network associated with the identified service interface.

2. The apparatus of claim 1 wherein the map comprises a lockup table.

3. The apparatus of claim 1 each of the service interfaces is associated with a channel identified by a predetermined connection identifier.

4. The apparatus of claim 3 wherein the connection-based network comprises an ATM network, channels in the connection-based network are each identified by a connection identifier comprising a VPI and a VCI and each of the service interfaces associated with the first one of the bridge ports is associated with a channel having the same predetermined VPI.

5. The apparatus of claim 4 wherein each of the service interfaces associated with the first one of the bridge ports is associated with a channel having a predetermined VCI and the VCI associated with each of the service interfaces associated with the first one of the bridge ports is different from the VCI associated with other ones of the service interfaces associated with the first one of the bridge ports.

6. The apparatus of claim 4 wherein a plurality of the bridge ports each have a plurality of associated service interfaces, the service interfaces associated with each one of the bridge ports are all associated with channels having the same predetermined VPI and the service interfaces associated with different ones of the plurality of bridge ports are associated with channels having different predetermined VPIs.

7. The apparatus of claim 1 comprising a mechanism configured to identify a service interface by way of which a data frame is received at the first one of the bridge ports from the connection-based network, assign a priority to the data frame based upon the correspondence provided by the map and tag the data frame with the assigned priority.

8. The apparatus of claim 1 comprising a scheme comprising a plurality of maps, each of the plurality of maps applicable to a different number of available channels wherein the forwarding system is configured to determine a number of available channels associated with the first bridge port and to select one of the plurality of maps in the scheme based upon the number of available channels.

9. The apparatus of claim 8 wherein the maps in the scheme provide mappings such that when the number of available channels is increased by adding a new available channel, the forwarding system selects a next one of the plurality of maps which requires rerouting only of frames having priorities corresponding to the new available channel.

10. The apparatus of claim 9 wherein the plurality of maps specify the correspondences between priorities and channels set out in Table I.

11. A VLAN comprising a plurality of segments each bridged to a connection-based network by an apparatus according to claim 1, the VLAN comprising:
    a first apparatus bridging a first segment to the connection based network; and
    a second apparatus bridging a second segment to the connection based network;
    the first and second apparatus interconnected by a plurality of channels in the connection-based network each of the channels having a first end point at one of the service interfaces in the first apparatus and a second end point at one of the service interfaces in the second apparatus.

12. A bridge for connecting a segment of a LAN to a connection-based network, the bridge comprising:
    a plurality of bridge ports;
    means for reading priorities of data frames directed by the bridge to at least a first one of the bridge ports;
    a plurality of service interfaces associated with the first one of the bridge ports, each of the service interfaces capable of being associated with a channel in a connection-based network;
    means for determining a number of the service interfaces associated with active channels in the connection-based network;
    means for establishing a mapping between user priorities read by the means for reading priorities of data frames and the service interfaces associated with active channels in the connection-based network based at least in part on a number of the service interfaces associated with active channels in the connection-based network; and,
    means for assigning frames to the service interfaces based upon the user priorities and the mapping.

13. The bridge of claim 12 wherein the connection-based network comprises an ATM network and the first one of the bridge ports is associated with a predetermined VPI.

14. The bridge of claim 13 wherein each of the service interfaces is associated with a predetermined VCI.

15. The bridge of claim 12 wherein the means for reading user priorities reads a three bit field in frames tagged with user priorities.

16. The bridge of claim 12 wherein the means for assigning frames received at the bridge port to the output ports operates according to Table I.

17. A method for directing frames between segments of a VLAN over a connection-based network, the method comprising:
receiving at a first bridge port connected to a first segment of a VLAN a frame addressed to a node on a second segment of the VLAN;
forwarding the frame to a second bridge port associated with a second segment of the VLAN and determining a user priority of the frame;
based on the user priority, assigning the frame to one of a plurality of service interfaces associated with the second bridge port, each of the service interfaces associated with a corresponding channel in a connection-based network and capable of delivering data to the second segment of the VLAN by way of the corresponding channel in the connection-based network; and,
as a consequence of assigning the frame to the one of a plurality of service interfaces, delivering data of the frame to the second segment of the VLAN by way of the corresponding channel.

18. The method of claim 17 comprising, before assigning the frames to one of the plurality of service interfaces, dropping any frames addressed to nodes on the first segment.

19. The method of claim 18 comprising, dropping the frames addressed to nodes on the first segment before reading the user priorities of the frames.

20. The method of claim 17 comprising identifying a set of the service interfaces which correspond to available channels wherein assigning each of the frames to one of a plurality of output ports comprises selecting a mapping based upon the number of available channels and assigning the frames to service interfaces of the set of service interfaces which correspond to available channels according to the mapping.

21. The method of claim 20 comprising assigning each of the frames to one of a plurality of service interfaces according to Table I.

22. The method of claim 20 comprising, while a current mapping is in effect, determining that a next channel has become available and switching to a next mapping, wherein the next mapping differs from the current mapping only in that one or more priorities are associated with the next channel.

23. The method of claim 20 comprising, upon failure of a channel associated with one of the service interfaces, adjusting the mapping by remapping one or more priorities associated with the one of the service interfaces to one or more other ones of the service interfaces.

24. The method of claim 23 wherein adjusting the mapping comprises bumping frames of each priority assigned to the failed channel to a channel associated with a next lower priority.

25. The method of claim 23 wherein adjusting the mapping comprises bumping frames of each priority assigned to the failed channel a channel associated with a lowest priority for which a channel remains available.

26. The method of claim 20 comprising upon failure of a channel associated with one of the service interfaces dropping frames having priorities associated with the one of the service interfaces.

27. The method of claim 20 comprising identifying a service interface by way of which a frame is received at one of the bridge ports from the connection-based network, assigning a priority to the data frame based upon the correspondence provided by the map and tagging the data frame with the assigned priority.

28. The method of claim 27 wherein the map associates a plurality of priorities with the identified service interface and the method comprises tagging the frame with a lowest one of the plurality of priorities.

* * * * *